United States Patent
Cernohous et al.

(10) Patent No.: US 7,552,237 B2
(45) Date of Patent: Jun. 23, 2009

(54) NETWORK ADDRESS CACHE APPARATUS AND METHOD

(75) Inventors: Bob Richard Cernohous, Rochester, MN (US); Timothy Dennis Mullenbach, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1262 days.

(21) Appl. No.: 10/273,218

(22) Filed: Oct. 17, 2002

(65) Prior Publication Data

US 2004/0078487 A1     Apr. 22, 2004

(51) Int. Cl.
    G06F 15/16        (2006.01)
(52) U.S. Cl. .................. 709/245; 709/223; 709/227
(58) Field of Classification Search .............. 709/245, 709/223, 228
    See application file for complete search history.

(56) References Cited

U.S. PATENT DOCUMENTS

| | | | | |
|---|---|---|---|---|
| 6,141,696 | A * | 10/2000 | Goertzel et al. ............. | 719/310 |
| 2001/0047421 | A1 * | 11/2001 | Sridhar et al. ............... | 709/230 |
| 2002/0059622 | A1 * | 5/2002 | Grove et al. .................. | 725/91 |
| 2003/0009591 | A1 * | 1/2003 | Hayball et al. .............. | 709/245 |
| 2003/0126252 | A1 * | 7/2003 | Abir .......................... | 709/223 |
| 2003/0149755 | A1 * | 8/2003 | Sadot ......................... | 709/223 |
| 2004/0024872 | A1 * | 2/2004 | Kelley et al. ................ | 709/225 |
| 2004/0128346 | A1 * | 7/2004 | Melamed et al. ............ | 709/203 |
| 2006/0117038 | A1 * | 6/2006 | Toebes et al. ............... | 707/100 |

OTHER PUBLICATIONS

Colajanni, M. and Yu, P. S. 1997. Adaptive TTL schemes for load balancing of distributed Web servers. SIGMETRICS Perform. Eval. Rev. 25, 2 (Sep. 1997), 36-42. DOI= http://doi.acm.org/10.1145/262391.262401.*

Colajanni, M.; Yu, P.S.; Dias, D.M., "Scheduling algorithms for distributed Web servers," Distributed Computing Systems, 1997., Proceedings of the 17th International Conference on , vol., no., pp. 169-176, May 27-30, 1997.*

(Continued)

*Primary Examiner*—Larry D Donaghue
*Assistant Examiner*—Ajay Bhatia
(74) *Attorney, Agent, or Firm*—Martin & Associates, LLC; Derek P. Martin

(57) ABSTRACT

Cached information that includes multiple network addresses is delivered in a manner that changes the order of the network addresses each time the cached information is delivered to a client, thereby achieving load balancing in a manner that reduces network traffic and improves system performance. In the preferred embodiments, the user defines a minimum time to live (TTL) and one or more order change criteria. When a query is made to a DNS, the DNS returns an answer that includes a time to live (TTL). This answer may be stored in a cache, and may include multiple network addresses. If the TTL for the answer received from a DNS is less that the minimum TTL, the TTL for the answer is set to the minimum TTL before storing the answer in the cache. When a query may be satisfied by a cached answer that includes multiple network addresses, a cache mechanism delivers the multiple cached network addresses in an order determined by the one or more order change criteria if the TTL for the cached results is a positive number. In this manner load balancing can be achieved while still benefiting from the performance enhancements of caching DNS query results.

11 Claims, 7 Drawing Sheets

OTHER PUBLICATIONS

Colajanni, M.; Yu, P.S.; Cardellini, V., "Dynamic load balancing in geographically distributed heterogeneous Web servers," Distributed Computing Systems, 1998. Proceedings. 18th International Conference on, vol., no., pp. 295-302, May 26-29, 1998.*

William LeFebvre, Ken Craig; "Rapid Reverse DNS Lookups for Web Servers"; 2nd USENIX Symposium on Internet Technologies & Systems, Oct. 11-14, 1999, Boulder, Colorado, USA.*

* cited by examiner

| Domain | Address |
|---|---|
| ibm.com | 129.142.17.99 |
| | 129.142.18.99 |
| | 129.142.19.99 |
| | 129.142.16.99 |

| Domain | Address |
|---|---|
| ibm.com | 129.142.18.99 |
| | 129.142.19.99 |
| | 129.142.16.99 |
| | 129.142.17.99 |

NETWORK ADDRESS CACHE APPARATUS AND METHOD

BACKGROUND OF THE INVENTION

1. Technical Field

This invention generally relates to computer systems, and more specifically relates to apparatus and methods for communicating between computer systems on a network.

2. Background Art

Since the dawn of the computer age, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users and software applications to communicate with each other over the network. One network that has become very popular is the Internet.

Web sites may be accessed via the Internet using Transmission Control Protocol/Internet Protocol (TCP/IP). One known version of Internet protocol defines 32 byte network addresses, known as IP addresses, that contain four fields separated by periods, with each field containing three decimal digits. Each IP address specifies a server that can access a specified web site.

To make web browsing more convenient and user-friendly, domain names were developed so that users would not have to enter the numerous digits that explicitly specify an IP address. Instead, a domain name is entered by the user, such as ibm.com. The domain name is passed to a special type of server known as a domain name server (DNS). The DNS is queried to determine which IP address or addresses correspond to a specified domain name. Thus, when an application such as a web browser queries a DNS for ibm.com, the DNS returns the IP addresses that correspond to the ibm.com web site, namely: 129.142.16.99, 129.142.17.99, 129.142.18.99, and 129.142.19.99, as shown in FIG. 4.

Many domains have a single IP address. However, there are many domains that have sufficient traffic that they require multiple servers to handle the number of requests they receive. For the ibm.com web site referenced above, we see that there are four different IP addresses that each correspond to a separate web server, each of which is capable of accessing the ibm.com web site.

When a software application queries a DNS and multiple IP addresses are returned, the first IP address is generally used by the software application, because in many cases there is only one IP address returned. If the DNS server for ibm.com returned the same four addresses in the same order each time, because most applications use the first IP address in the list, the result would be that the server that corresponds to the first address would service most of the requests. In other words, the load would not be balanced between servers. To avoid this situation, known DNS servers use a round robin approach to delivering IP addresses to achieve dynamic load balancing. If most applications use the first IP address in the list returned from the DNS server, simply rotating the list of IP addresses with each DNS request results in a rough form of load balancing. Thus, a first request for ibm.com to a DNS could return the IP addresses in the order shown in FIG. 4. A second request for ibm.com to the DNS could take the first item on the list and move it to the end of the list, and return a new list as shown in FIG. 5. A third request would move the first item on the list in FIG. 5 and move it to the end of the list before returning the new list. In this manner the load of requests may be effectively balanced between multiple web servers.

To improve system performance, many computer systems include caching resolvers that store domain names and their corresponding IP address or addresses in a cache for future use. Thus, when a domain name needs to be referenced, the resolver first checks to see if there is a cache entry that includes the IP address or addresses for the specified domain name. If so, the resolver can deliver the IP address or addresses to the requesting application without querying the DNS, thereby reducing network traffic and enhancing system performance.

One problem with caching domain names and their corresponding IP address information is that caching can frustrate load balancing schemes employed by the DNS if the cache entries are valid for a long period of time. As a result, each answer returned by a DNS in response to a query includes a time to live, or TTL. To maintain proper load balancing, the DNS typically sets the TTL to a relatively short time, which requires that clients (and resolvers) periodically perform new queries. The shorter the TTL, the less valuable is a cache in a resolver, and the more network traffic is generated. For these reasons, there is an inherent tension between time to live (TTL) for DNS answers and the desire to improve system performance by caching DNS answers. Without a way to achieve better load balancing in a manner that takes greater advantage of caching, the computer industry will continue to tradeoff TTL for DNS answers and performance improvements realizable from caching.

DISCLOSURE OF INVENTION

According to the preferred embodiments, cached information that includes multiple network addresses is delivered in a manner that changes the order of the network addresses each time the cached information is delivered to a client, thereby achieving load balancing in a manner that reduces network traffic and improves system performance. In the preferred embodiments, the user defines a minimum time to live (TTL) and one or more order change criteria. When a query is made to a DNS, the DNS returns an answer that includes a time to live (TTL). This answer may be stored in a cache, and may include multiple network addresses. If the TTL for the answer received from a DNS is less that the minimum TTL, the TTL for the answer is set to the minimum TTL before storing the answer in the cache. When a query may be satisfied by a cached answer that includes multiple network addresses, a cache mechanism delivers the multiple cached network addresses in an order determined by the one or more order change criteria if the TTL for the cached results is a positive number. In this manner load balancing can be achieved while still benefiting from the performance enhancements of caching DNS query results.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention relates to querying a domain name server (DNS) to determine one or more network addresses that correspond to a specified domain name. For those individuals who are not generally familiar with DNS and caching of DNS query results, the Overview section below presents many concepts that will help to understand the invention.

1. Overview

Known Domain Name Servers

Figure 2:
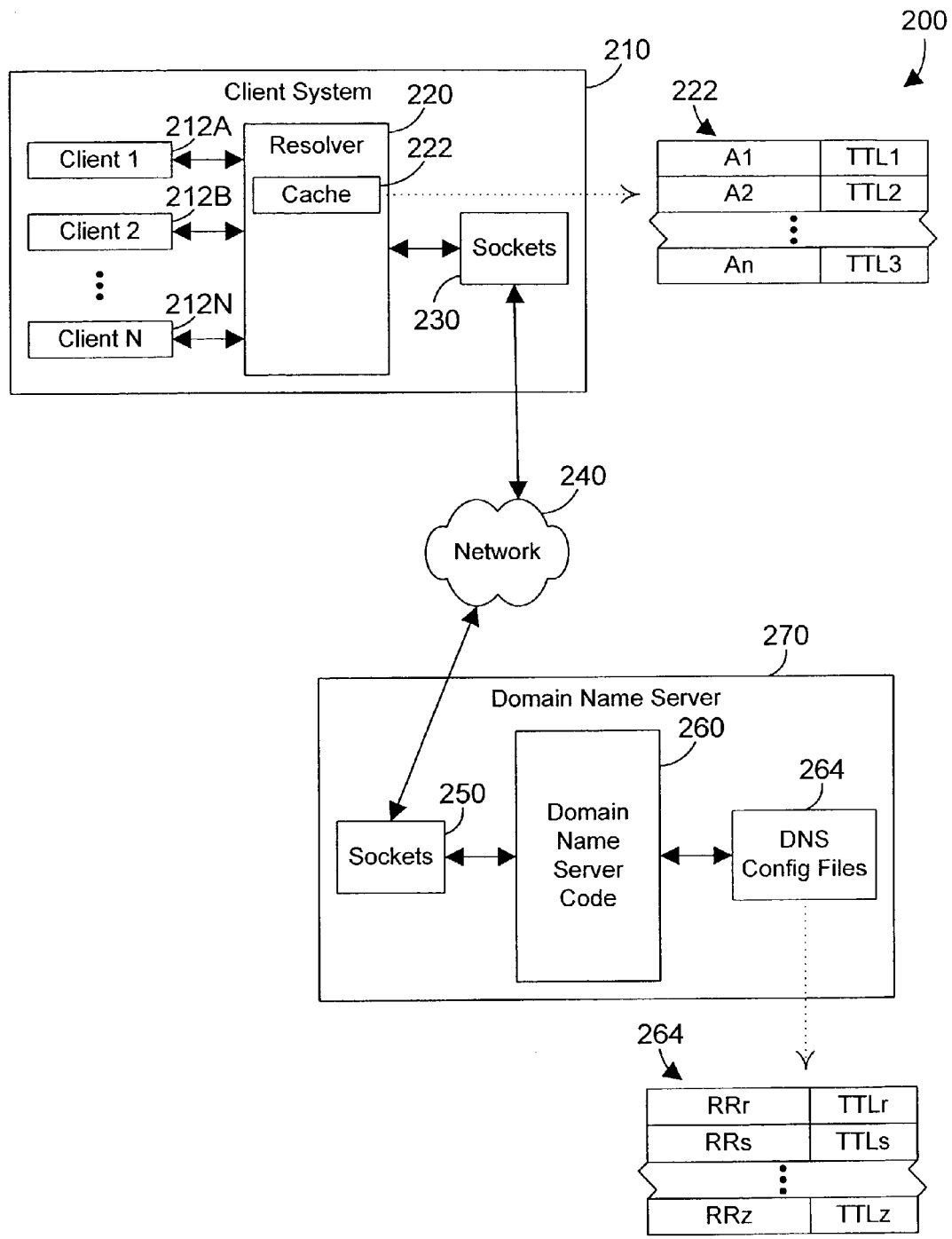
FIG. 2 is a block diagram showing a sample prior art networked computer system.

Domain Name Servers (DNSs) were developed to allow navigating to web sites using common names that are readily understood by a human instead of using numerical network addresses. A sample computer system 200 known in the art is shown in FIG. 2. A client system 210 is shown connected via a network 240 to a domain name server (DNS) 270. Client system 210 includes for the sake of illustration multiple clients 212, shown in FIG. 2 as 212A, 212B, . . . , 212N. Each client is coupled to a resolver 220 that includes a cache 222. Resolver 220 is coupled to sockets 230, which are connected to network 240.

DNS 270 also includes sockets 250 coupled to network 240. Sockets 250 are also coupled to DNS code 260. Configuration files 264 define the relationship between domain names and their corresponding network addresses. As shown by the dotted arrow pointing downward from configuration files 264 in FIG. 2, configuration files 264 preferably include multiple resource records RR, each with a corresponding time to live TTL. Thus, resource record "r" (RRr) has a corresponding time to live "r" (TTLr). In similar fashion, resource record "s" (RRs) has a corresponding time to live "s" (TTLs), and resource record "z" (RRz) has a corresponding time to live "z" (TTLz). Each resource record in configuration files 264 may specify a corresponding TTL.

Known Load Balancing in Domain Name Servers

Figures 3, 4, 5:
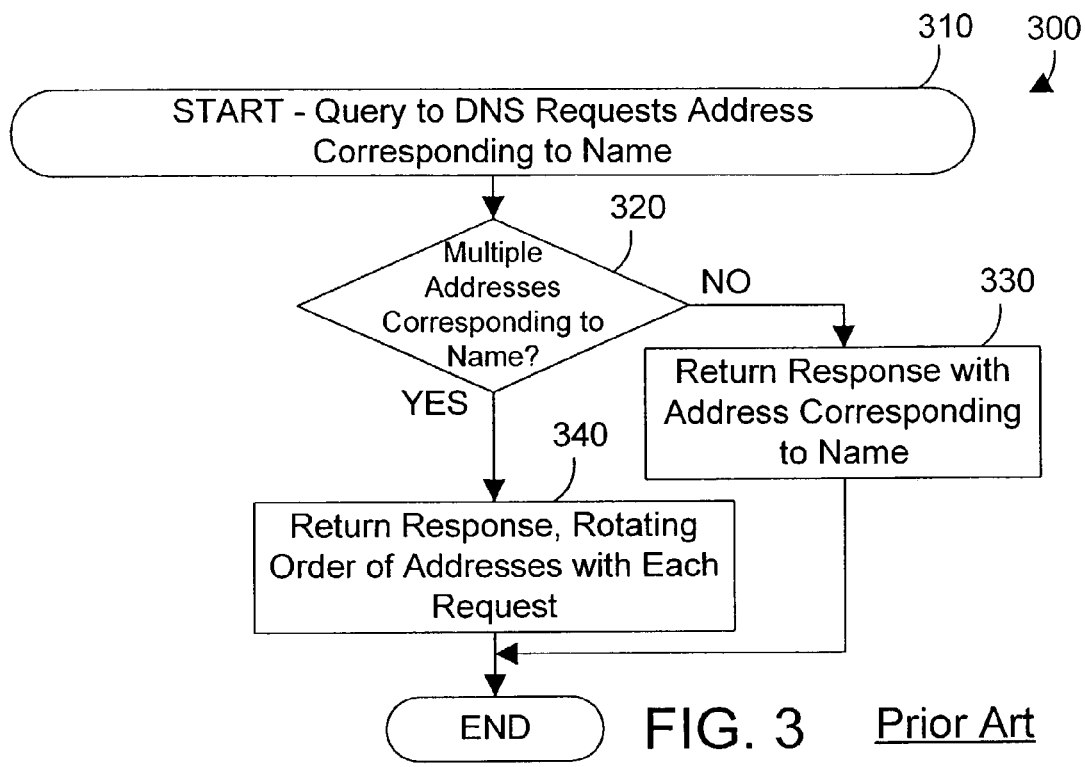
FIG. 3 is a flow diagram of a prior art method for a domain name server (DNS) to achieve load balancing by round robin rotation of network addresses returned as a result of a query.
FIG. 4 is a table showing multiple network addresses that may be returned for the domain ibm.com.
FIG. 5 is a table showing the multiple network addresses for ibm.com in FIG. 4 in a different order.
Figure 6:
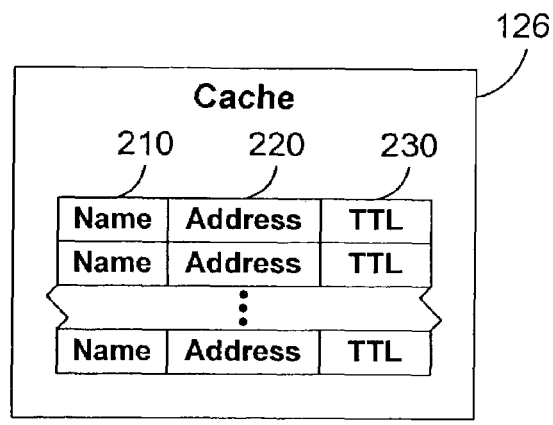
FIG. 6 is a block diagram of a prior art cache for storing the results of querying a DNS.

Known domain name servers have employed a round robin type of load balancing when multiple IP addresses exist for a specified domain name. Referring to FIG. 3, a prior art method 300 for DNS 270 of FIG. 2 starts when DNS 270 receives a query that requests an IP address that corresponds to a specified name (step 310). The configuration files 264 is consulted, and if the name exists in the configuration files 264, method 300 determines whether there are multiple IP addresses that correspond to the specified name (step 320). If not (step 320=NO), method 300 returns an answer with the single IP address that corresponds to the specified name (step 330). If there are multiple corresponding IP addresses (step 320=YES), an answer that includes multiple IP addresses is returned, with the order of IP addresses being rotated in round robin fashion with each request (step 340). Because client applications typically use the first IP address returned in a response to a DNS query, a rough form of load balancing can be achieved by rotating the order of addresses in round robin fashion with each request.

An example of round robin load balancing by a DNS is shown in FIGS. 4 and 5. We assume that a query for ibm.com is submitted to a DNS, which returns four IP addresses as a result, as shown in FIG. 4. The next time a query for ibm.com is received by the DNS, the first IP address is dropped to the bottom of the list, and the new list of IP addresses is returned in a different order, as shown in FIG. 5. It will be obvious to the reader that the next time a query for ibm.com is received by the DNS, the first IP address in FIG. 5 will be dropped to the bottom of the list, and so on. Note that after four queries for ibm.com have been processed, the fifth query will result in the same address list shown in FIG. 4. Rotating the IP addresses in round robin fashion achieves a rough load balancing (or load sharing) between servers that correspond to the IP addresses.

Caching of Results Obtained from a Domain Name Server

Referring back to FIG. 2, in the case of internet domain names and their corresponding IP addresses, each entry in the resolver's cache 222 includes an answer and a corresponding time to live TTL, as shown by the dotted line from cache 222 in client system 210. An answer may include one or more IP addresses. Thus, in FIG. 2 we see that answer 1 (A1) has a corresponding time to live TTL1. In similar fashion, each resource record in cache 222 includes a corresponding time to live, as shown in FIG. 2 as A2 having a corresponding time to live TTL2, and An having a corresponding time to live TTLn.

Figure 7:
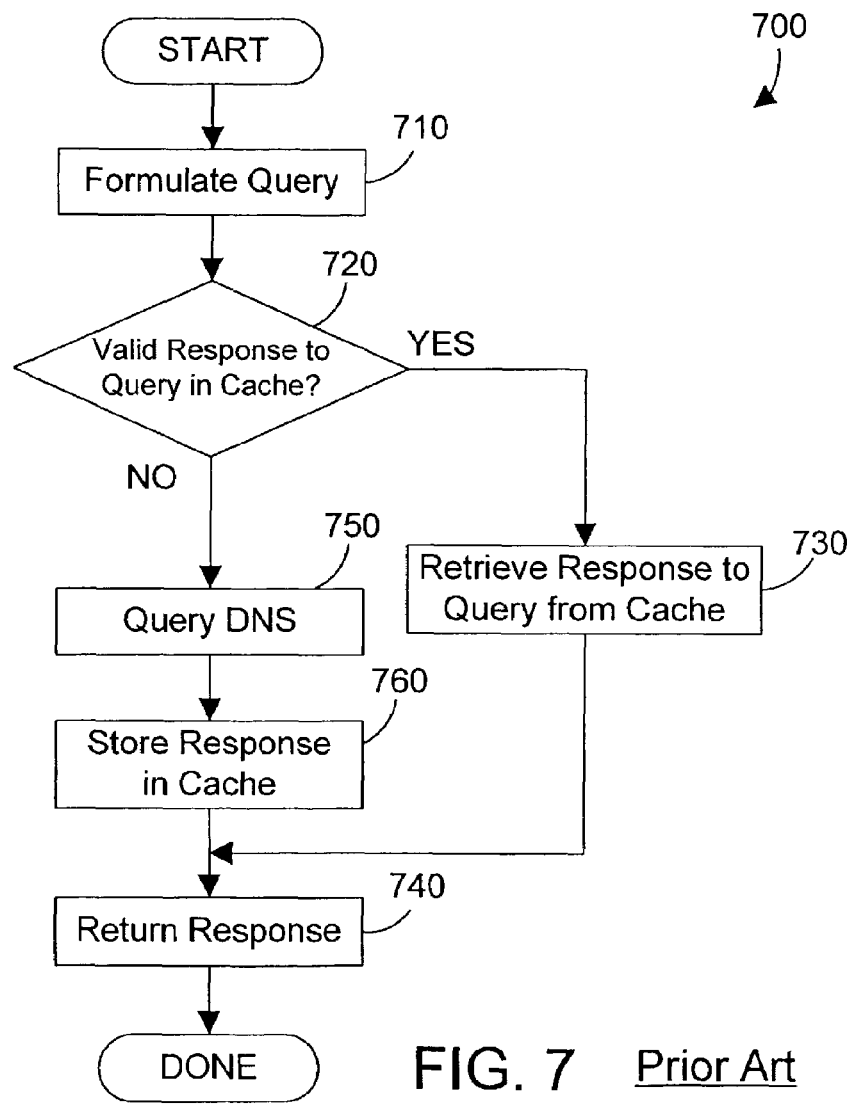
FIG. 7 is a flow diagram of a prior art method for querying a DNS.

A prior art method for determining one or more network addresses that correspond to a specified domain name is shown as method 700 in FIG. 7. The method steps in FIG. 7 are discussed with reference to FIG. 2. When an application, such as client 212A, needs to determine an IP address that corresponds to a domain name, such as ibm.com, the client formulates a query (step 710), and submits the query to resolver 220. In response, resolver 220 checks its cache 222 to see if it has a valid response in the cache that satisfies the query. A cached response is valid if the response is still alive (i.e., has a positive time to live). If the cache contains a valid response that satisfies the query (step 720=YES), the response to the query is retrieved from the cache (step 730) and returned to the requesting client (step 740).

If there is no valid response in the cache that satisfies the query (step 720=NO), the DNS is queried (step 750) by the resolver sending a query via sockets 230, network 240, and sockets 250 to DNS code 260. DNS code 260 looks in its DNS config files 264 for a name that matches the name specified in the query, namely ibm.com for this specific example. We assume that there is an entry in DNS config files 264 for ibm.com that includes the four IP addresses shown in FIG. 4. An answer that contains the four IP addresses is returned in response to the query, with a time to live (TTL) that is set by DNS code 260, which is typically a small value to help with more effective load balancing by not allowing IP addresses for a domain name to be valid for very long. The response to the query is returned via sockets 250, network 240, and sockets 230 to resolver 220, which stores the response to the query in its cache 222 (step 760), and returns the response to the requesting application (step 740).

Note that the functions of DNS 270 have been simplified herein for the sake of illustration. For example, DNS 270 may include a cache that contains answers obtained from other DNSs. If DNS code 260 does not know the answer to a query, it may generate a query to a different DNS, which may generate a query to yet another DNS until a DNS with the answer is located. These details of how multiple DNSs cooperate to deliver an answer are not discussed further because they are not critical to understanding the preferred embodiments of the present invention. For the specific example shown in FIGS. 2 and 8, we assume that DNS 270 has responsibility for the ibm.com domain name, and thus includes resource records in its configuration files 264 that include the four IP addresses shown in FIGS. 4 and 5 that correspond to the domain ibm.com.

There is an inherent tension between the desire to cache responses from a DNS and the desire for a DNS to achieve load balancing. A long time to live (TTL) for a cached response increases the performance of queries that return that response, but also increases the likelihood of negatively affecting the load balancing of the DNS. A short TTL for a cached response increases network traffic and decreases performance by increasing the number of times the DNS must be queried, but enhances the load balancing between network addresses.

2. Detailed Description

The preferred embodiments enhance the performance of a computer system by increasing a small time to live (TTL) for a cached DNS response to a larger specified minimum while minimizing the negative impact on load balancing by the DNS by changing the order of network addresses returned from the cache. The cache mechanism of the preferred embodiments thus simulates load balancing by changing the order of network addresses, preferably with each query. The result is cached responses that may be used for a much longer period of time because their use over the longer period of time does not significantly affect the load balancing of the DNS.

Figure 1:
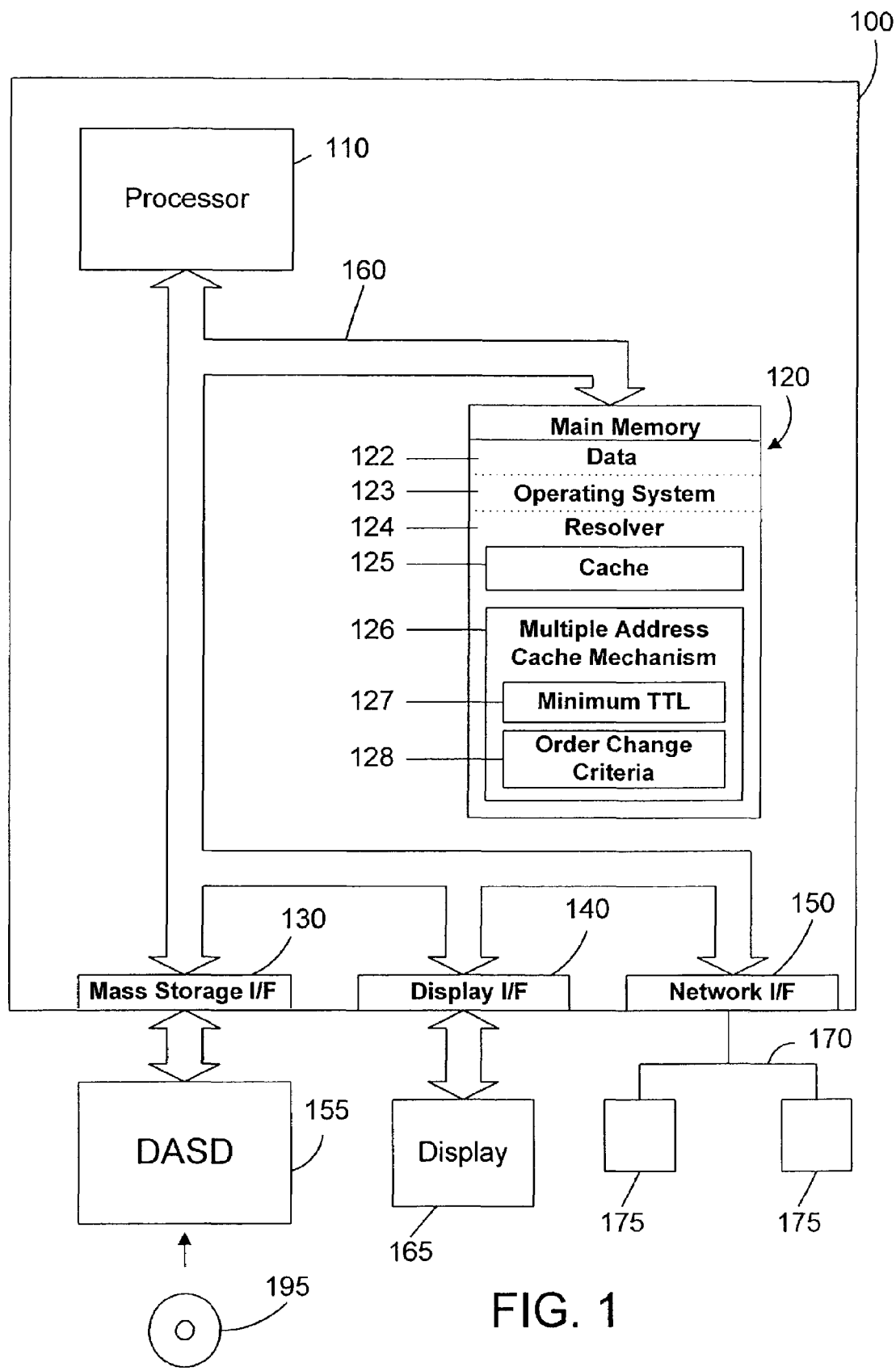
FIG. 1 is a block diagram of an apparatus in accordance with the preferred embodiments.

Referring now to FIG. 1, a computer system 100 is one suitable implementation of an apparatus in accordance with the preferred embodiments of the invention. Computer system 100 is an IBM iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD-RW drive, which may store data to and read data from a CD-RW 195.

Main memory 120 in accordance with the preferred embodiments contains data 122, an operating system 123, and a resolver 124. Resolver 124 preferably includes a cache 125 and a multiple address cache mechanism 126, which performs its functions according to a specified minimum time to live 127 and one or more order change criteria 128. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 123, and resolver 124 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Data 122 represents any data that serves as input to or output from any program in computer system 100. Operating system 123 is a multitasking operating system known in the industry as OS/400; however, those skilled in the art will appreciate that the spirit and scope of the present invention is not limited to any one operating system. Resolver 124 is preferably a caching resolver that locally stores name and corresponding network address information retrieved from a domain name server into its cache 125. Multiple address cache mechanism 126 performs two distinct functions unknown in the prior art. First, if the time to live for a query response from a domain name server that includes multiple network addresses is less than the specified minimum time to live 127, the cache mechanism 126 sets the time to live for the query response to the minimum time to live when storing the query response in the cache 125. Second, when an entry in cache 125 that includes multiple network addresses satisfies a query, the cache mechanism 126 reorders the list of network addresses each time the cache mechanism 126 returns the list of multiple network addresses in response to the query. These functions are conceptually quite simple, yet powerful. In the prior art, the time to live for responses to queries by a DNS are relatively short to assure that proper load balancing is achieved. In the invention, proper load balancing may be achieved for a longer period of time because the cache mechanism 126 itself performs load balancing by reordering the list of network addresses each time the list is accessed from the cache. As a result, the short time to live that accompanies a DNS response may be replaced with a significantly longer time (namely, the minimum TTL 127) because of the load balancing achieved by the cache mechanism 126.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 123. Operating system 123 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD-RW (e.g., 195 of FIG. 1), and transmission type media such as digital and analog communications links.

Figure 8:
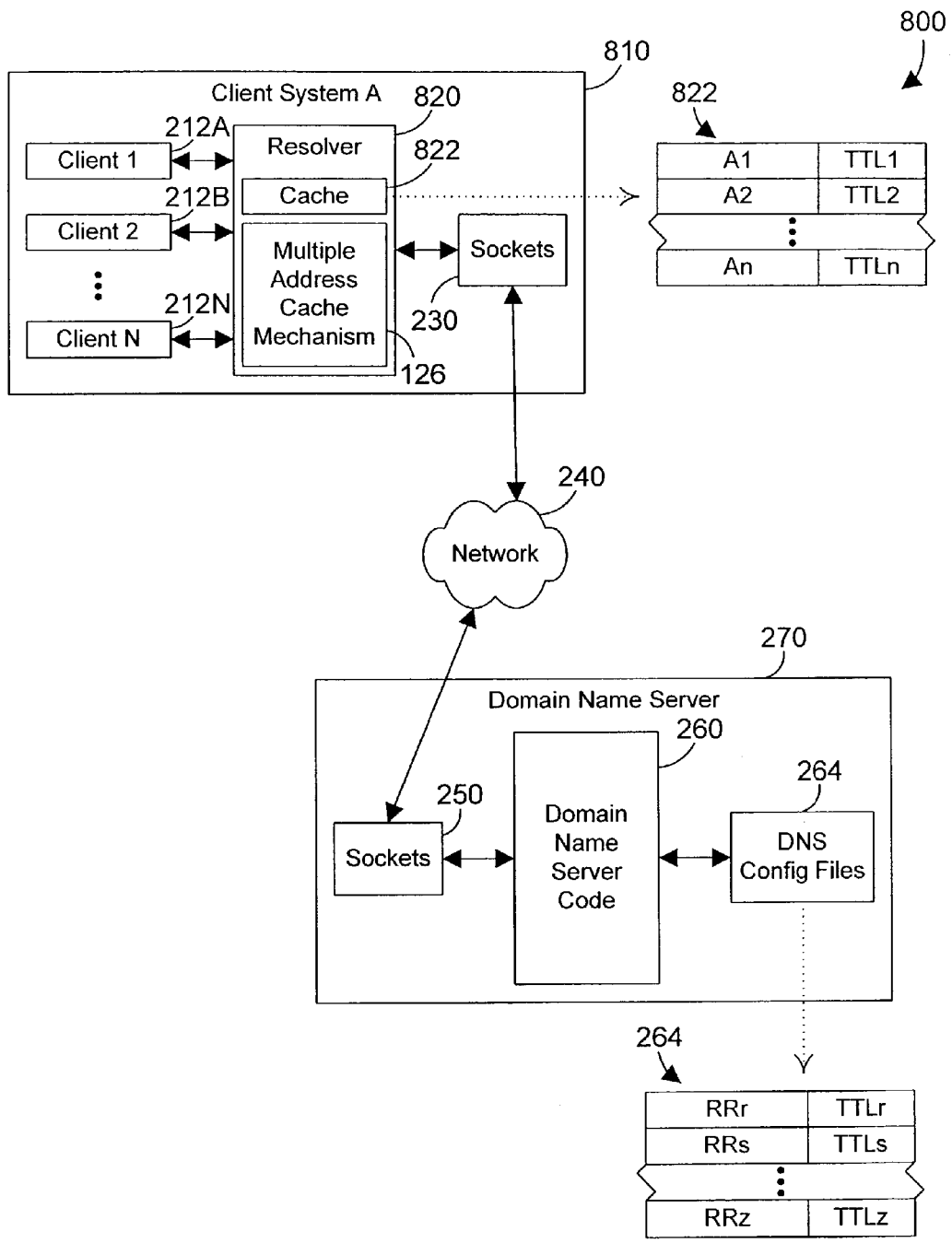
FIG. 8 is a block diagram of a networked computer system in accordance with the preferred embodiments.
Figure 9:
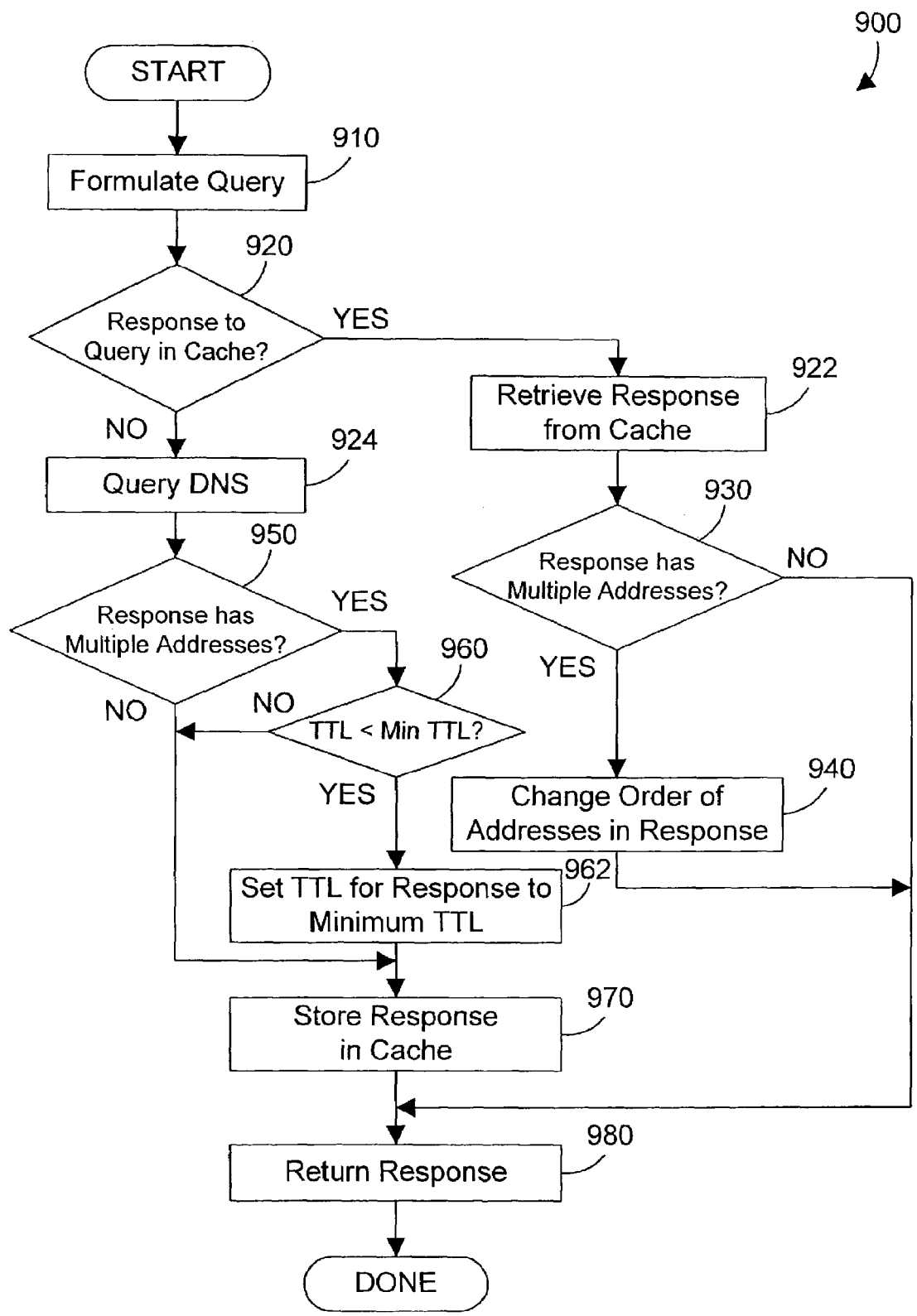
FIG. 9 is a flow diagram of a method in accordance with the preferred embodiments for processing a name query.

Referring now to FIG. 8, a networked computer system 800 in accordance with the preferred embodiments is similar to the prior art computer system 200 of FIG. 2, with the exception of clients system 810, which includes a resolver 820 that contains a cache 822 and the multiple address cache mechanism 126. As a result, cache 822 includes entries whose TTL has been set to the minimum TTL 127 (see FIG. 1). Note that entries in cache 822 are preferably invalidated when the TTL is no longer positive. System 800 is best understood with reference to method 900 in FIG. 9. First, a query is formulated (step 910). In the preferred embodiments, we assume a query is formulated on one of the clients, such as client 212A. Method 900 then determines whether the response to the query is in the cache 822 (step 920). If so (step 920=YES), the response is retrieved from the cache (step 922). If the response has only one network address (step 930=NO), the response with the single network address is returned to satisfy the query (step 980). If the response has multiple network addresses (step 930=YES), the order of the network addresses is changed (step 940), and the response that includes the reordered network addresses is returned (step 980). Note that the reordering of network addresses in step 940 is preferably performed in accordance with order change criteria 128. If the response to the query is not in the cache (step 920=NO), resolver 820 queries DNS code 260 (step 924) via sockets 230, network 240, and sockets 250. If the response from the DNS has multiple network addresses (step 950=YES), method 900 checks to see if the time to live for the response is less than the specified minimum time to live 127 (step 960). If so (step 960=YES), the time to live for the response is set to the minimum time to live 127 (step 962), the response is stored in the cache 822 (step 970), and the response is returned (step 980). If the response does not have multiple network addresses (step 950=NO), or if the time to live for the response is greater than or equal to the minimum time to live (step 960=NO), the response is stored in the cache 822 with its original time to live (step 970), and the response is returned (step 980).

Figure 10:
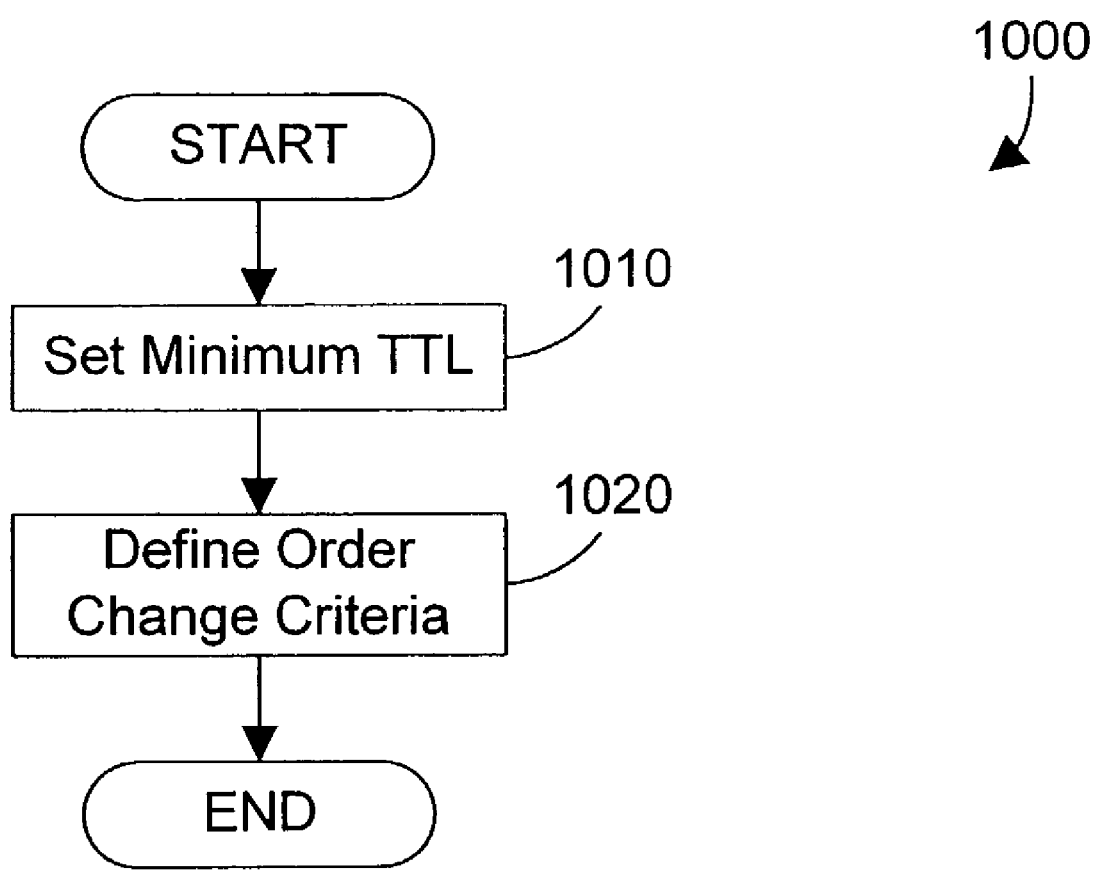
FIG. 10 is a flow diagram of a method in accordance with the preferred embodiments for setting the minimum TTL and defining one or more order change criteria.

To function properly, method 900 requires a specified minimum time to live 127 and one or more order change criteria 128. Method 1000 in FIG. 10 shows steps for setting these parameters. First, the minimum time to live 127 is set (step 1010). Next, the order change criteria is defined (step 1020). Note that these functions may be performed by a computer program, or may be performed by interacting with a human user via a user interface. In the preferred embodiments, step 1010 allows a human user to enter an amount of time as the minimum time to live. Experiments with the preferred embodiments have shown that a minimum time to live of ten minutes yields results that significantly reduce network traffic and improve performance while minimally affecting the load balancing of a domain name server. Note, however, that the minimum time to live 127 can vary according to the desired tradeoff between system performance and load balancing. In the preferred embodiments, step 1020 presents a user interface to the user that allows the user to select one or more criteria for changing the order of network addresses returned from the cache 822 when an entry contains multiple network addresses. A simple example of an order change criterion is to specify round robin rotation of the network addresses. FIGS. 4 and 5 illustrate two sequential accesses to a response that includes multiple network addresses when a round robin order change criterion is used. Note that FIGS. 4 and 5 were discussed in the Overview section to illustrate round robin rotation of network addresses by a DNS, which is known in the art. The preferred embodiments additionally include round robin rotation of network addresses by a cache mechanism, which is not known in the art.

Other suitable order change criteria 128 may be specified. For example, a random number generator could generate a number between 0 and 1.0, and could multiply the result by the number of network addresses in the response to randomly pick one of the addresses to move to the top of the list. Another suitable order change criteria 128 may perform a modulus function on a number less than or equal to the number of network addresses in the response. The preferred embodiments expressly extend to any suitable order change criteria 128 that is capable of changing the order of network addresses in the response, whether now known or developed in the future.

The preferred embodiments enhance system performance with only a minimal effect on load balancing. By performing load balancing of cached responses in addition to load balancing of responses from the DNS, the time to live of DNS responses may be set to the specified minimum time to live 127. In other words, the specified minimum TTL 127 is a floor. Values under the minimum TTL 127 are set to the minimum TTL 127, while values over the minimum TTL 127 are left alone. Specifying a minimum TTL 127 reduces network traffic and enhances system performance by increasing the hit rate to the cache 822 without significantly impacting load balancing by the DNS, because the cache mechanism 126 also performs load balancing. In the preferred embodiments, the order change criteria 128 used to reorder network addresses in cached responses is preferably the same criteria used to reorder network addresses by the DNS. Note, however, that the preferred embodiments expressly extend to any combination of order change criteria.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A client computer system coupled via a network to a domain name server that changes order of a plurality of network addresses corresponding to a selected domain with each request to the domain name server for a network address corresponding to the selected domain, the client computer system comprising:
   (A) a resolver coupled to the domain name server, the resolver comprising:
      (A1) a cache containing a plurality of entries, at least one entry including a first list of network addresses corresponding to a selected domain that are retrieved from the domain name server; and
      (A2) a cache mechanism that changes order of network addresses in the first list of network addresses delivered from the cache according to at least one order change criterion when the at least one entry that includes the first list of network addresses satisfies a query, and that queries the domain name server if no entry in the cache satisfies the query, wherein the cache mechanism determines time to live for the first list of network addresses when the first list of network addresses is received from the domain name server, that determines whether the time to live is less than a specified minimum time to live, that sets the time to live to the specified minimum time to live if the time to live is less than the specified minimum time to live, and that writes the first list of network addresses and corresponding time to live to a cache entry;
   (B) at least one client application coupled to the resolver that queries the resolver to determine network addresses that corresponds to the selected domain.

2. The client computer system of claim 1 wherein the cache mechanism uses at least one order change criterion to determine how to change the order of network addresses in the first list.

3. The client computer system of claim 2 wherein the at least one order change criterion comprises a round robin rotation of the network addresses in the first list.

4. A networked computer system comprising:
   (A) a domain name server that changes order of a plurality of network addresses corresponding to a selected domain with each request to the domain name server for a network address corresponding to the selected domain; and
   (B) a client computer system coupled via a network to the domain name server, the client computer system comprising:
      (B1) a resolver coupled to the at least one client application and coupled to the domain name server, the resolver comprising:
         (B1A) a cache containing a plurality of entries, at least one entry including a first list of network addresses corresponding to a selected domain that are retrieved from the domain name server; and
         (B1B) a cache mechanism that changes order of network addresses in the first list of network addresses delivered from the cache when the at least one entry that includes the first list of network addresses satisfies a query, and that queries the domain name server if no entry in the cache satisfies the query, wherein the cache mechanism determines time to live corresponding to the first list of network addresses when the first list of network addresses is received from the domain name server, that determines whether the time to live is less than a specified minimum time to live, that sets the time to live to the specified minimum time to live if the time to live is less than the specified minimum time to live, and that writes the first list of network addresses and corresponding time to live to a cache entry;
      (B2) at least one client application that queries the resolver to determine at least one network address that corresponds to the selected domain.

5. A method for responding to a query from a client application for at least one network address corresponding to a selected domain name, the method comprising the steps of:
   (A) retrieving a plurality of network addresses corresponding to the selected domain name from a domain name server;
   (B) storing the plurality of network addresses corresponding to the selected domain name in a cache that may be accessed by the client application by performing the steps of:
      (B1) reading a time to live for the plurality of network addresses;
      (B2) determining whether the time to live for the plurality of network addresses is less than a specified minimum time to live;
      (B3) if the time to live for the plurality of network addresses is less than the specified minimum time to live, setting the time to live for the plurality of network addresses to the defined minimum time to live; and
      (B4) storing the plurality of network addresses corresponding to the selected domain name in a cache entry in the cache;
   (C) in response to the query from the client application, determining whether an entry in the cache satisfies the query;
   (D) if no entry in the cache satisfies the query, querying the domain name server; and
   (E) if an entry in the cache satisfies the query, performing the steps of:
      (E1) reading the cache entry;
      (E2) determining whether the cache entry includes a plurality of network addresses;
      (E3) if the cache entry includes a plurality of network addresses, performing the steps of:
         (E3A) reordering the plurality of network addresses; and
         (E3B) returning the cache entry with the reordered network addresses.

6. The method of claim 5 wherein step (E3A) reorders the plurality of network addresses according to at least one order change criterion.

7. The method of claim 6 wherein the at least one order change criterion comprises a round robin rotation of the plurality of network addresses.

8. A method for responding to a query from a client application for at least one network address corresponding to a selected domain name, the method comprising the steps of:
   (A) retrieving a plurality of network addresses corresponding to the selected domain name from a domain name server;
   (B) reading a time to live for the plurality of network addresses;

(C) determining whether the time to live for the plurality of network addresses is less than a specified minimum time to live;

(D) if the time to live for the plurality of network addresses is less than the specified minimum time to live, setting the time to live for the plurality of network addresses to the defined minimum time to live;

(E) storing the plurality of network addresses corresponding to the selected domain name and the time to live for the plurality of network addresses in a cache that may be accessed by the client application;

(F) in response to the query from the client application, determining whether an entry in the cache satisfies the query;

(G) if no entry in the cache satisfies the query, querying the domain name server; and (H) if an entry in the cache satisfies the query, performing the steps of:

(H1) reading the cache entry;

(H2) determining whether the cache entry includes a plurality of network addresses;

(H3) if the cache entry includes a plurality of network addresses, performing the steps of:

(H3A) reordering the plurality of network addresses in a round robin fashion; and (H3B) returning the cache entry with the reordered network addresses.

9. A computer-readable program product comprising:

(A) a resolver comprising:

(A1) a cache containing a plurality of entries, at least one entry including a first list of network addresses corresponding to a selected domain that are retrieved from a domain name server; and (A2) a cache mechanism that changes order of network addresses in the first list of network addresses delivered from the cache according to at least one order change criterion when the at least one entry that includes the first list of network addresses satisfies a query, and that queries the domain name server if no entry in the cache satisfies the query, wherein the cache mechanism determines time to live for the first list of network addresses when the first list of network addresses is received from the domain name server, that determines whether the time to live is less than a specified minimum time to live, that sets the time to live to the specified minimum time to live if the time to live is less than the specified minimum time to live, and that writes the first list of network addresses and corresponding time to live to a cache entry; and (B) recordable media bearing the resolver.

10. The program product of claim 9 wherein the cache mechanism uses at least one order change criterion to determine how to change the order of network addresses in the first list.

11. The program product of claim 10 wherein the at least one order change criterion comprises a round robin rotation of the network addresses in the first list.

* * * * *